Jan. 8, 1952 — P. H. DANLY ET AL — 2,581,637
CLUTCH ASSEMBLY FOR PRESSES
Filed Nov. 3, 1947 — 6 Sheets-Sheet 3

INVENTORS
PHILO H. DANLY
GEORGE I. DANLY
VASIL GEORGEFF
ATTORNEY

Jan. 8, 1952 P. H. DANLY ET AL 2,581,637
CLUTCH ASSEMBLY FOR PRESSES
Filed Nov. 3, 1947 6 Sheets-Sheet 6

INVENTOR.
PHILO H. DANLY
GEORGE I. DANLY
VASIL GEORGEFF
BY Henry L. Shenier
ATTORNEY Patented Jan. 8, 1952

2,581,637

UNITED STATES PATENT OFFICE 2,581,637

CLUTCH ASSEMBLY FOR PRESSES

Philo H. Danly, Hinsdale, George I. Danly, Elmhurst, and Vasil Georgeff, Chicago, Ill., assignors to Danly Machine Specialties, Inc., Chicago, Ill., a corporation of Illinois Application November 3, 1947, Serial No. 783,745

1 Claim. (Cl. 192—113)

Our invention relates to a fluid pressure operated brake and clutch assembly for presses and, more particularly, to an improved brake and clutch assembly for power presses in which the brake and clutch are set by fluid pressure acting against the action of springs and in which the brake and clutch structures are constantly cooled by heat exchange with air.

In most clutch assemblies for power presses in the prior art the clutch comprises a flywheel carrying a clutch disc and the operating mechanism, which, when the assembly is in unclutched position, is stationary. The result of this practice is that in going from unclutched to clutched position it is necessary to overcome the inertia of all of the operating parts of the clutch which are normally at rest, thus requiring the consumption of large amounts of energy to bring heavy, normally stationary parts to the speed of the rotating clutch disc.

In the former constructions, too, the working parts of the brake normally rotate when the clutch is in connected position. A brake disc secured to a stationary part of the assembly is adapted to be gripped by the brake parts upon the unclutching of the driving disc. All of the energy consumed in bringing the heavy parts up to speed is then dissipated in the form of heat in stopping their rotation by means of the brake.

In a power press the energy required per stroke is substantially the product of the average load and the working distance plus a friction allowance. In short stroke operations such as blanking the working energy is largely supplied from the kinetic energy stored in the flywheel and the motor serves merely to return the flywheel to speed during the large part of the cycle in which no work is done. In drawing operations, the working period is longer and in many cases the motor takes an increased part of the working load.

It is common practice in power presses to employ a continuously running motor driving a flywheel which is adapted to be clutched to and unclutched from the gear train driving an eccentric or crank. The arrangement is such that the ram and associated drive when unclutched from the flywheel are brought to rest and immobilized by a brake. At the start of the working stroke the brake is substantially simultaneously released and the clutch engaged. Since large amounts of energy must be handled the friction involved, especially in large presses, is high. This friction stops the press when the clutch is disengaged and the brake set. Friction engages the flywheel with the working train of the press when the clutch is again engaged. The result is that large amounts of heat are developed from the friction, both in the clutching operation and the braking operation. The heat which may frequently be considerable has a deleterious effect on the clutch and brake lining material which results in a rapid deterioration of the brake and clutch linings. Then, too, a heat resistant type of brake and clutch lining material must be used which results in a noisy operation. The use of a harder lining material requires increased clutch and brake surfaces as the coefficient of friction between the lining material and the coacting friction plates is less than in the case of a softer and more deformable lining material. This latter material gives a greater friction, smoother action and more quiet operation than the harder brake lining material. The softer material, however, is so susceptible to heat that it cannot ordinarily be successfully employed.

Then, too, the heat generated can be injurious to other parts of the clutch and brake. The metal plates which bear against the lining can become warped or pitted by the heat. The springs can lose some of their temper and worst of all, the piston packing in the air cylinder, whether it be leather, rubber or synthetic material, can become hardened or otherwise deteriorated by heat and become leaky to the point of rendering the clutch and brake inoperative.

As a consequence of the deterioration of brake linings as a result of heat much time is lost in pressing operations in replacing brake linings and other parts. This is especially burdensome if the press is part of a production line since the entire line is blocked by a press, the clutch and brake linings and other parts of which must be renewed.

In the brake and clutch assemblies of the prior art a single operating member was employed which simultaneously set the brake and released the clutch or vice versa. The clutching pressure must be greater than the braking pressure since the clutch must hold during peak forces which take place during the working cycle of the press. This is achieved by providing a large area over which the fluid pressure, usually compressed air, is permitted to act. The total pressure required in the case of the brake assembly is much smaller and it is usually supplied by springs against the action of which, the brake is released.

One object of our invention is to provide an improved press clutch and brake assembly in which the mass of the clutch and brake parts which must be started and stopped is greatly reduced, thereby not only saving energy now normally dissipated in heat but also reducing the heat generated.

Another object of our invention is to provide an improved press clutch and brake assembly in which the clutch and brake parts are continuously cooled by circulated air so that the heat generated by the clutch and brake operations will be constantly dissipated to enable the clutch and brake parts to operate at a lower temperature.

Another object of our invention is to provide an improved press clutch and brake assembly in which the clutch and brake linings will automatically equalize their wear.

Another object of our invention is to provide an improved fluid pressure operated clutch and brake assembly for power presses which is adequately and efficiently lubricated.

Other and further objects of our invention will appear from the following description.

In the accompanying drawings which form part of the instant specification and which are to be read in conjunction therewith and in which like reference numerals are used to indicate like parts in various views.

In general, our invention contemplates the mounting of the clutch and brake discs upon a press shaft secured thereto for rotation therewith. The working parts of the clutch structure are secured to the flywheel for rotation therewith. In this manner it is not necessary to start and stop the larger mass of the working parts of the clutch structure since these are permitted to rotate at all times. The clutch structure, furthermore, is formed with integral centrifugal buckets adapted to form a centrifugal fan for circulating cooling air through the clutch parts. Similarly, the operating parts of the brake structure remain stationary at all times and only the brake disc rotates when the clutch is engaged. By this construction we are enabled to save large amounts of energy normally wasted in bringing heavy masses up to speed and then having to stop them upon the application of the brake. The reduction of the masses which must be started and stopped, furthermore, reduces the heat which must be dissipated resulting from friction. We provide the flywheel with a plurality of blades extending parallel to the axis of rotation to form a centrifugal fan adapted to draw cooling air through the brake structure.

Our brake and clutch discs are provided with a plurality of openings in which are loosely positioned discs of lining material, the construction being such, that the individual discs are free to rotate to equalize wear. We provide a system of lubrication so that all bearings may be thoroughly and, if desired, continuously lubricated.

Figure 1:
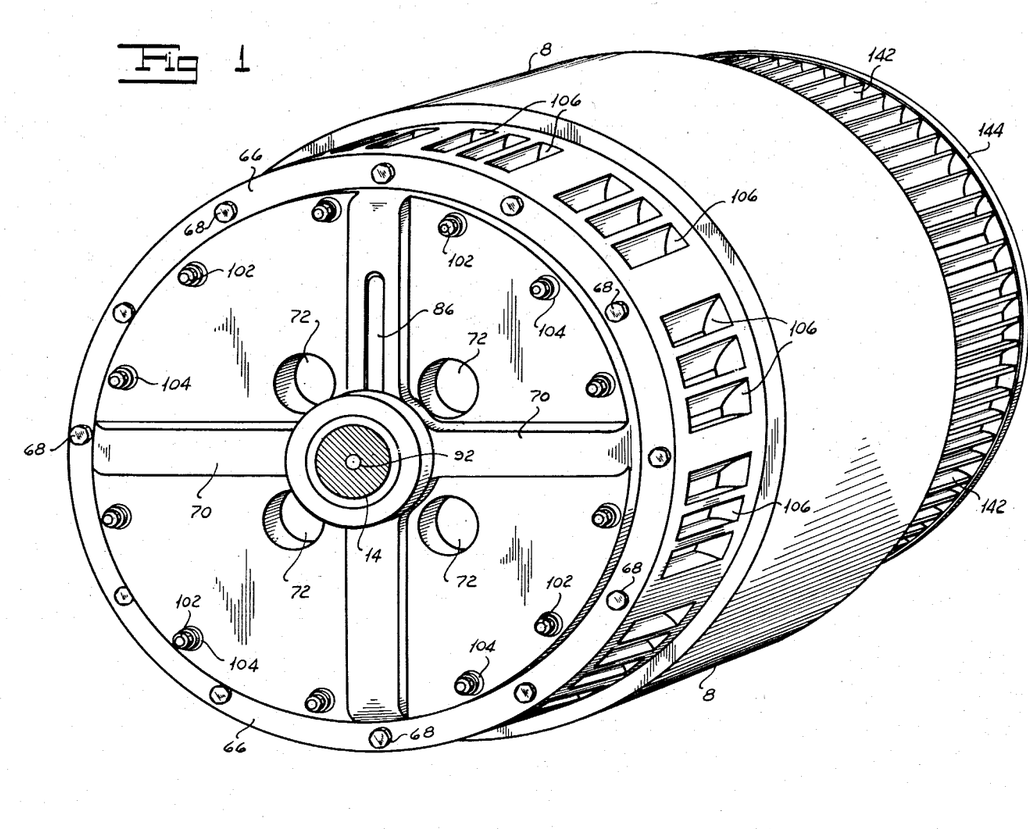
Fig. 1 is a perspective view showing our improved brake and clutch assembly.
Figure 2:
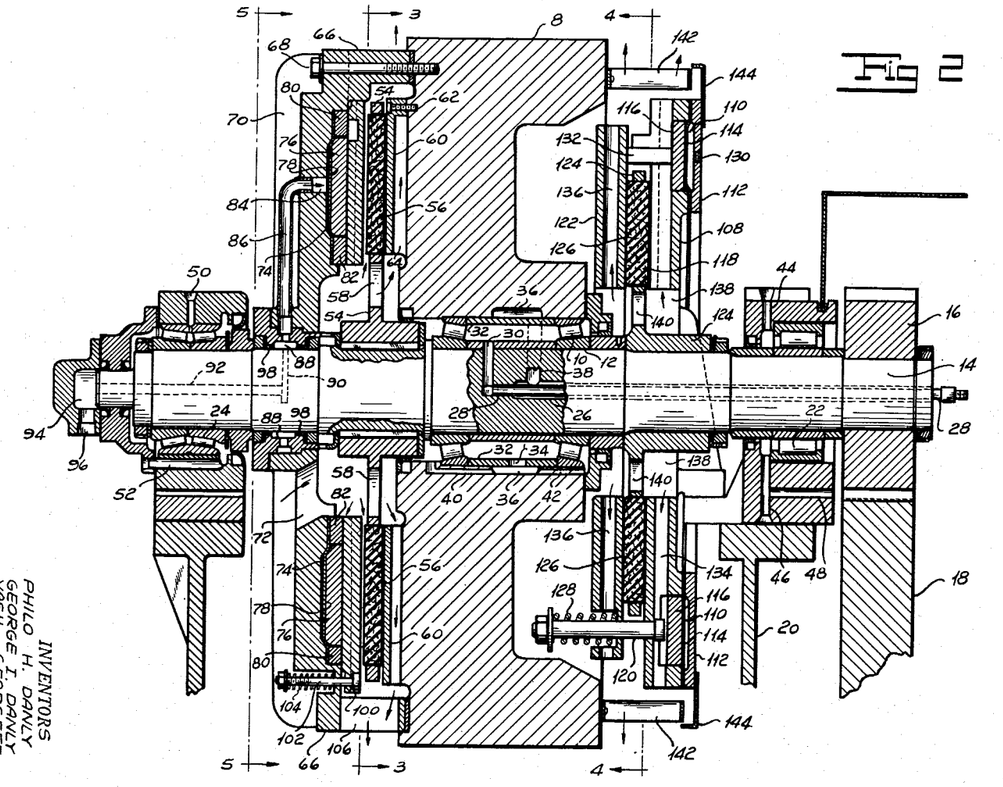
Fig. 2 is a sectional elevation of the assembly shown in Fig. 1.

More particularly, referring now to the drawings, a flywheel 8 is adapted to rotate on roller bearings 10. The flywheel may be driven by a belt (not shown) or in any other suitable manner from a prime mover such as an electric motor or the like. An inner-race 12 for the roller bearings 10 is secured to a shaft 14 to which is secured for rotation therewith a spur gear 16 meshing with a gear 18 of the working train of the press. It will be noted that the shaft 14 is the highest speed shaft of the press. By associating our improved brake and clutch assembly with the highest speed shaft we are enabled to reduce the size thereof. Because of our improved construction we do not encounter deleterious heat and are thus enabled to produce an improved assembly which may be more economically constructed. The press frame 20 supports the shaft 14 adjacent its ends by roller bearing 22 and roller bearing 24. The shaft 14 is provided with a bore 26 in which is lodged a pipe 28. The pipe 28 communicates with a side duct 30 opening between rollers 10 of the flywheel bearing. The outer-race 32 of the flywheel bearing is provided with an opening 34 communicating with an annular groove 36 formed in the flywheel. A side duct 38 provides communication between the bore 26 and the annular groove 36. The construction is such that the lubricant will flow through pipe 28 into the flywheel bearing lubricating rollers 10 and both inner and outer races. A pair of lateral ducts 40 and 42 are formed in the flywheel providing communication between the annular groove 36 and the space outside the rollers 10. Lubricant which passes by the rollers 10 finds its way through ducts 40 and 42 into the annular groove 36 whence it is thrown out by centrifugal force and may overflow through duct 38 and bore 26.

A lubricating duct 44 is adapted to provide lubricant to the rollers 22 of one of the shaft bearings. Lubricant is adapted to drain through ducts 46 and 48. The other end bearing of the shaft 14 is provided with a lubricant opening 50 through which lubricant is adapted to lubricate the rollers 24 and drain through duct 52.

A clutch disc 54 is secured to the shaft 14 for rotation therewith and is provided with a plurality of openings in which discs 56 made of any suitable clutch lining material are lodged. The disc 54 is also provided with a plurality of openings 58 adapted to permit the passage of cooling air as will be pointed out more fully hereinafter. A clutch plate 60 is secured to the flywheel by a plurality of bolts 62. It is provided with a number of radial passageways 64, formed by curved fins, adapted to permit the passage of cooling air and assist in its movement. A clutch housing 66 is secured to the flywheel by means of a plurality of bolts 68. The housing is formed with strengthening ribs 70 and a plurality of openings 72 adapted to permit the ingress of cooling air. The interior of the clutch housing 66 is provided with an annular cylinder 74 in which is seated an annular piston 76. A flexible elastic sealing strip 78 is lodged in the annular cylinder and retained therein by means of a pair of stationary rings 80 and 82. A duct 84 provides communication between the exterior of the clutch housing 66 and the interior of the annular clutch cylinder 74. A pipe 86 provides communication between the duct 84 and the manifold 88 which extends around shaft 14. A cross duct 90 in the shaft 14 provides communication between the manifold 88 and the longitudinal duct 92 which extends axially of the shaft 14 terminating in the stationary manifold 94 to which fluid under pressure, such as compressed air or the like, is adapted to be admitted through the passage 96. The manifold 88 is provided with suitable packing 98. A clutch plate 100 is carried by the clutch housing 66 by means of bolts 102 around which are lodged springs 104. The clutch plate 100 is free to move under the influence of the clutch piston 66 against the action of springs 104. The periphery of the clutch housing 66 is formed with a plurality of centrifugal buckets 106 forming a centrifugal fan adapted to throw air outwardly which is drawn in through the openings 72 whereby the continuous flow of air will pass in heat exchange relation with the clutch parts carrying away the heat developed.

Figure 3:
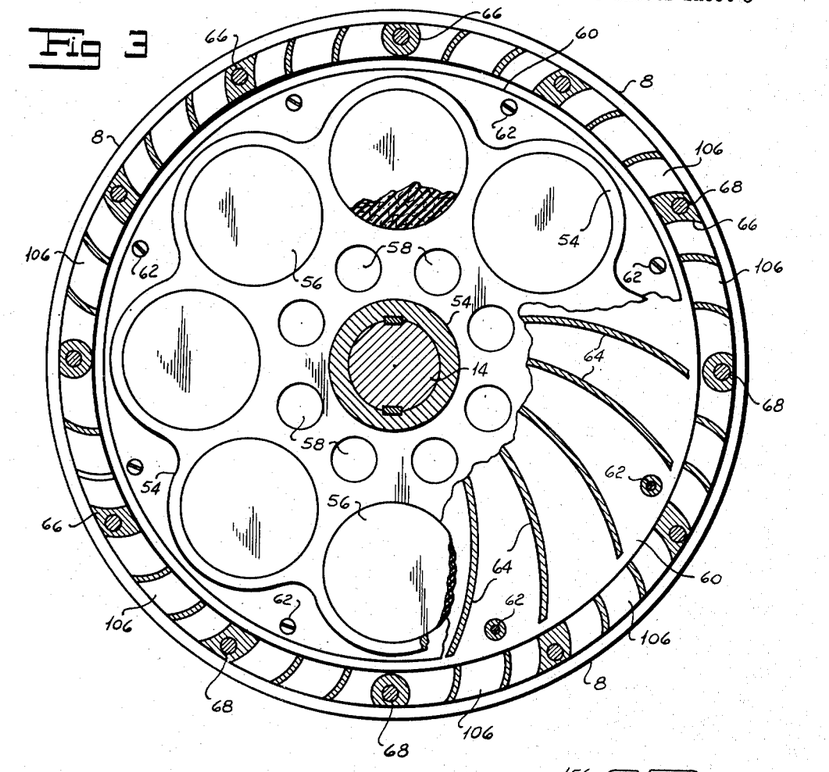
Fig. 3 is a sectional view, with parts broken away, taken on the line 3—3 of Fig. 2.
Figure 4:
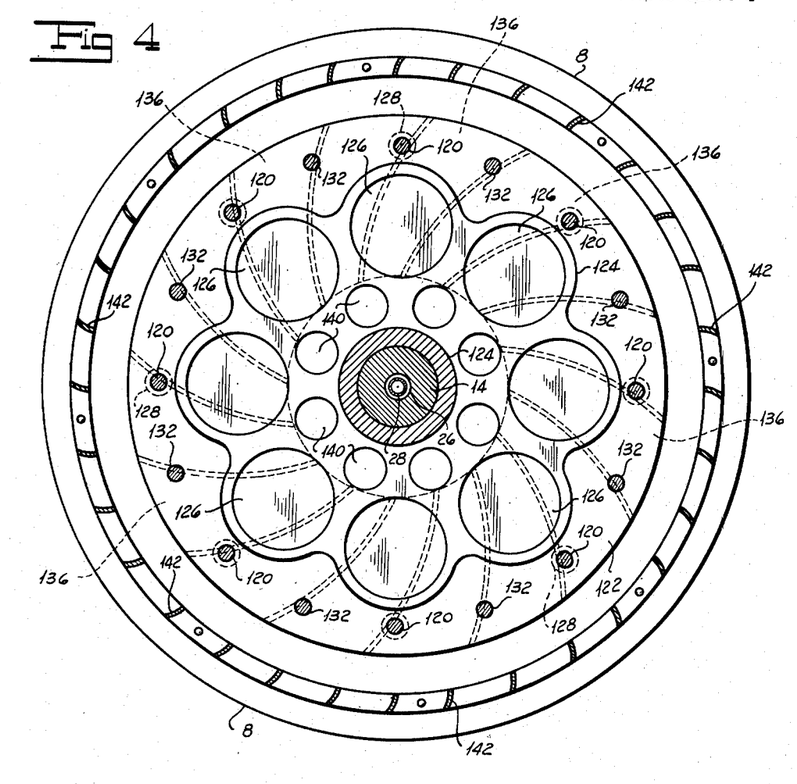
Fig. 4 is a sectional view taken on the line 4—4 of Fig. 2.
Figure 5:
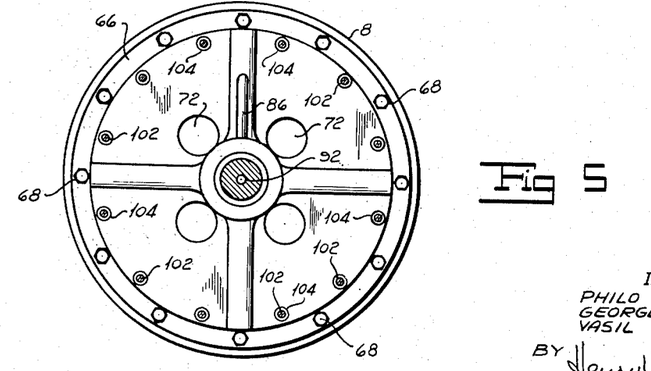
Fig. 5 is a sectional view drawn on a smaller scale taken along the line 5—5 of Fig. 2.

The clutch lining discs 56 can readily be seen by reference to Fig. 3. They are lodged in the openings in the clutch disc 54 with sufficient clearance so that they may rotate to equalize wear. The relative motion at the time of engagement is such that if a high spot exists in a clutch lining disc 56 a rotary movement of the clutch lining disc will occur. This rotary motion in contact with the clutch plate 100 or the stationary clutch plate 60 is such as to cause a reduction of the high spot. It will be seen that our construction is such that very close conformity will ensue between the surfaces of the clutch lining discs 56 and their coacting clutch plate surfaces. The clutch disc retainer 54 may be rigidly secured to the shaft so that each of the clutch discs 56 may move in their openings when the clutch is operated, thus avoiding wear on metal parts which would otherwise take place by the sliding of the clutch disc retainer along the shaft.

The brake housing 108 is stationary and is supported from the press structure in any suitable manner. It is formed with an annular cylinder 110 provided with a cylinder cover plate 112 secured thereto in any suitable manner. Clamped between brake housing 108 and the cylinder cover 112 we provide a flexible seating member 114 made of rubber or the like. An annular brake piston 116 is seated in the annular cylinder. The left hand surface 118 of the brake housing 108 forms a stationary brake plate. Spacedly mounted from the brake surface 118 and carried by the brake housing 108 by means of a plurality of bolts 120, we mount a movable brake plate 122. Secured to the shaft 14 for rotation therewith we provide a brake disc 124 similar in construction to the clutch disc 54 and provided with a plurality of openings in which a plurality of brake lining discs 126 are adapted to be movably seated. A plurality of springs 128 urge and bias the movable brake plate 122 to the right as viewed in Fig. 2 clamping the brake disc between the stationary and movable brake plates when the brake is in set position.

The brake disc retainer 124 may likewise be rigidly secured to the shaft. The movable lodged brake discs are free to move to accommodate the motion of the movable brake plate when the brake is set.

The brake cylinder cover 112 is provided with an internally threaded opening 130 adapted to receive a pipe communicating with a source of fluid pressure. A plurality of thrust pins 132 extend between the brake piston 116 and the movable brake plate 122 so that upon the introduction of fluid pressure into the brake cylinder the brake piston will be moved to the left as viewed in Fig. 2 against the action of the springs 128 to release the brake. The brake housing is provided with a plurality of passageways 134 formed internally thereof by a plurality of curved fins for the passage of cooling air. Similarly, the movable clutch plate 122 is provided with a plurality of passageways 136 formed by a plurality of curved fins for the passage of cooling air. The brake housing is formed with a number of openings 138 communicating with the atmosphere. The brake disc 124 is formed with a number of openings 140 adapted to permit the passage of cooling air. Mounted adjacent the periphery of the flywheel 8 and extending over the brake assembly, we provide a plurality of centrifugal fan blades 142 adapted to form a centrifugal fan. A shrouding 144 is carried by the brake housing and prevents the short circuiting of air.

It will be noted that the brake springs 128 are much stouter than the clutch springs 104. Similarly, it will be observed that the area of the clutch lining discs 56 is much larger than the area of the brake lining discs 126. Then, too, the area of the clutch piston 76 is larger than the area of the brake piston 116. If the same fluid pressure were instantly applied to the brake and the clutch simultaneously the clutch would grip before the brake is released causing increased friction and greater wear of the clutch lining discs or the brake lining discs or both and inducing unnecessary heat as a result of this friction. For optimum operation there should be a simultaneous release of the brake and an engaging of the clutch. In stopping there should be a simultaneous setting of the brake and a release of the clutch. If the fluid medium under pressure be a liquid, no difficulty will be experienced since liquids are incompressible and the action is analagous to a mechanical connection. It is customary, however, to operate the clutch and brake structures by means of compressed air and in order to insure the proper synchronism of the clutch and brake operations we provide means for making the necessary adjustments.

Figure 6:
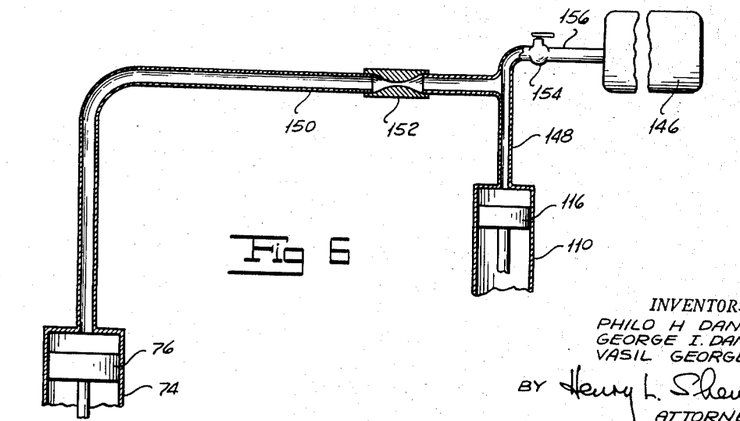
Fig. 6 is a diagrammatic view showing the fluid pressure connections to the brake and clutch cylinders.

Referring now to Fig. 6 which is a diagrammatic view, the brake cylinder 110 is connected to a source of compressed air 146 by means of a pipe 148. The clutch cylinder 74 is connected to the source of compressed air by means of a conduit 150 in which is interposed an apertured septum or venturi 152. A quick-acting valve 154 is interposed between the source of compressed air 146 and the conduits 148 and 150. It will be noted furthermore, that the conduit 148 is shorter in length than the conduit 150. The length of the conduits and the area of the septum is such that the transient pressures are so adjusted that the brake piston 116 and the clutch piston 76 will operate in proper timed relation. After the brake has been released and the clutch set the full pressure existing in the air manifold 156 will build up behind the clutch piston 76 and the brake piston 116.

It will be noted that upon failure of the fluid pressure medium, the springs 128 will immediately set the brakes and the springs 104 will immediately release the clutch. This is a safety feature preventing loss of control in event of a rupture of the fluid pressure line or the loss of fluid pressure.

In operation, let us assume that the shaft 14 is stationary and that the flywheel 8 is rotating at its designed speed. During this rotation, air is being thrown out by the buckets 106 formed in the clutch housing and air will pass through the openings 72 through the clutch parts and be thrown outwardly by the passageways 64 carrying heat away from the clutch structure. All of the clutch structure except the clutch disc 54 is rotating. At the same time, the centrifugal fan formed by blades 142 carried by the flywheel will throw air outwardly adjacent the brake structure drawing air through openings 138 and through passageways 134 and 136 to cool the brake parts. The springs 128 have caused the clamping of the brake disc 124 and its associated brake lining discs 126 between the stationary clutch plate surface 118 and the movable clutch member 122. Both the brake piston and the clutch piston are under atmospheric pressure. The springs 102 hold the clutch plate 100 in retracted or unclutched position.

Let us now assume it is desired to place the press, with which our brake and clutch assembly is associated, into operation. A control valve is opened permitting fluid pressure to be exerted on top of the brake and clutch pistons. With respect to the clutch assembly this fluid pressure is led through connection 96, through duct 92, through cross passage 90 to the manifold 88, thence through pipe 86 to the clutch cylinder moving the clutch plate 100 to the right as viewed in Fig. 2 and clamping the clutch disc 54 and its associated clutch lining discs 56 between it and the backing clutch plate 60, both of which clutch plates are rotating with the flywheel. At the same time, fluid pressure is led through a conduit (not shown) secured in the threaded opening 130 of the brake cylinder cover plate 112. The brake piston 116 moves to the left as viewed in Fig. 2 transmitting its motion through thrust members 132 to the movable brake plate 122, carrying this plate to the left as viewed in Fig. 2, against the action of springs 128 releasing the brake disc 124 and its associated brake lining discs 126 at the same time that clutch disc 54 is being clamped between the clutch plates under the influence of clutch piston 76. The shaft 14 now being clutched to the moving clutch parts and being released from the stationary brake parts rotates at the speed of the flywheel 8.

As is pointed out hereinabove, shaft 14 is the highest speed shaft of the press and transmits its motion through a gear train initiating with spur gear 16. The mechanical advantage of the gear train and eccentrics is such that the magnitude of the forces represented at the working level of the press are greatly reduced at the driving level of the press. Accordingly, we are enabled to use much smaller dimensions for both the clutch and brake parts than would be the case if the clutch and brake assembly were employed on a lower speed shaft. We are enabled to do this partially because of our improved construction and partially because of our combination cooling system which is built into the structure. The use of our cooling assembly carries away the heat and keeps the working temperature of the brake and clutch parts at a safe, lower limit. Since we are enabled to increase the friction by the use of a softer lining material, we may employ still smaller dimensions for the parts. On the other hand, we are enabled to use a softer lining material and to apply our brake and clutch assembly on a higher speed shaft by reason of our cooling system which is part of our novel and improved construction.

A brake and clutch assembly in accordance with our invention of dimensions customarily used on a 50 ton press has been assembled under load conditions found in a 300 ton press. Our assembly was operated continuously by means of an automatic control for long periods of time. Under these conditions our assembly was found to reach a maximum temperature which it did not pass and which was a function of the temperature of the surrounding air. This temperature did not exceed a safe temperature which did not deleteriously affect the clutch linings.

Referring now to Figs. 7 to 10 inclusive, we have shown another construction embodying our invention in which a pair of brake shoes are employed between the stationary brake plate and the movable brake plate.

Figure 7:
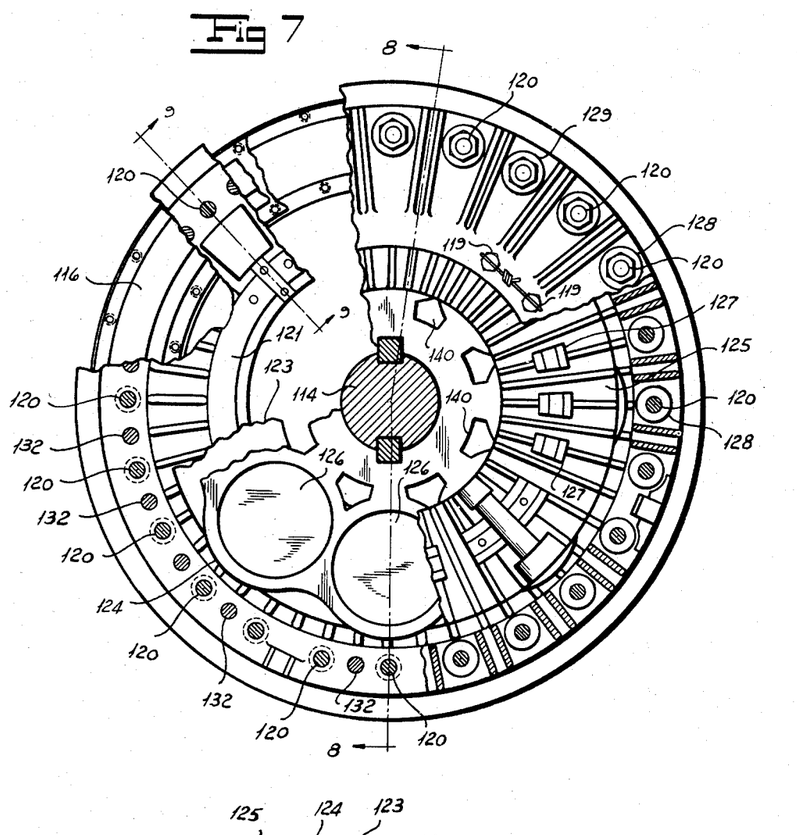
Fig. 7 is a sectional elevation similar to Fig. 4 with parts broken away showing another embodiment of the brake assembly of our invention.
Figures 8, 9:
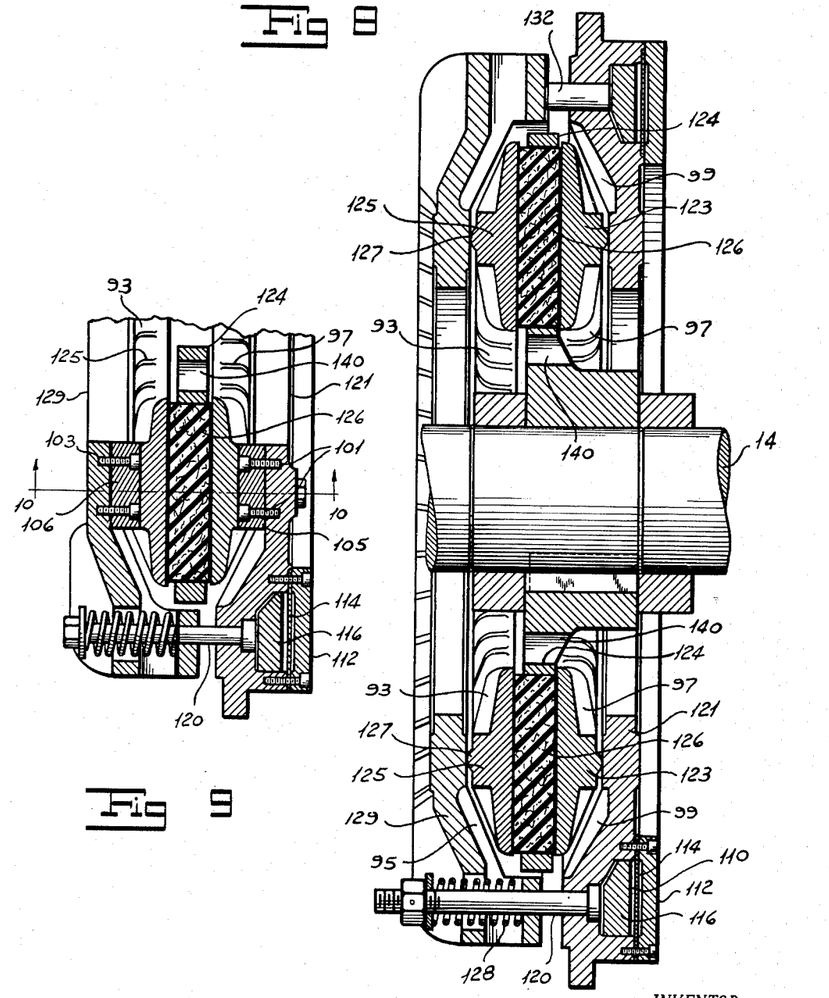
Fig. 8 is a sectional view taken on the line 8—8 of Fig. 7.
Fig. 9 is a fragmentary sectional view taken on the line 9—9 of Fig. 7.

The stationary brake plate is replaced by a brake ring 121 provided with heat exchange fins 99. The stationary brake ring 121 coacts with a circular brake shoe 123 provided with heat exchange fins 97. The movable brake ring 129 is provided with heat exchange fins 95 and is provided with a movable brake shoe 125. The brake shoes are provided with rounded bearing surfaces 127 which will permit an equalization of the pressure in event of distortion of either of the brake rings so that the brake shoes will always bear evenly against the brake discs 126. The movable brake shoe 125 is provided with heat exchange fins 93.

Figure 10:
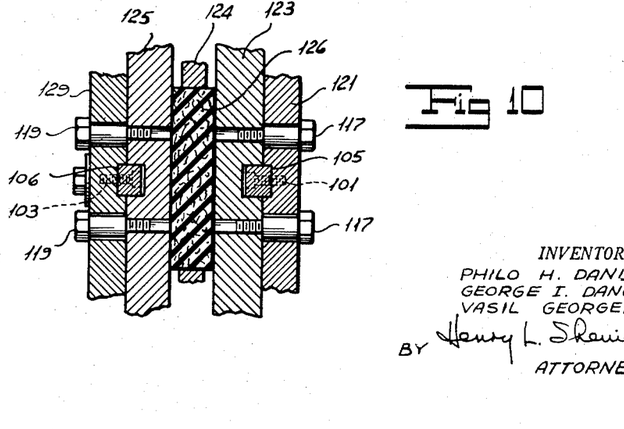
Fig. 10 is a fragmentary sectional view taken on the line 10—10 of Fig. 9.

The brake shoes are secured to the brake rings by bolts 117 and 119 as can readily be seen by reference to Fig. 10. It will be seen that the shanks of the bolts 117 and 119 are slightly smaller than the apertures in the brake rings through which they pass. This permits a small amount of relative motion between the brake shoes and their respective brake rings. The thrust between the brake shoes and the brake rings is taken up by thrust blocks 105 and 109 secured to the brake rings by tap screws 101 and 103 as can readily be seen by reference to Figs. 9 and 10.

It will be seen that we have accomplished the objects of our invention. We have provided an improved press clutch and brake assembly in which the mass of clutch and brake parts, which must be started and stopped, is greatly reduced. Disregarding the inertia of the load, which is the same for purposes of comparison, we must start only a comparatively light clutch disc and a comparatively light brake disc moving these from a position of rest to operating speed. Similarly, we must overcome only the momentum of these comparatively light discs in stopping the press. We are enabled thereby not only to save energy but to reduce the heat generated in the clutching and braking operation. We have provided an assembly in which the clutch and brake parts are continuously cooled by circulated air constantly dissipating the heat generated, whereby the clutch and brake parts operate at a lower temperature. We have provided a clutch and brake assembly in which the clutch and brake linings will automatically equalize their wear and thus provide for efficient working surfaces. We have provided an assembly in which all of the bearings are efficiently and thoroughly lubricated and which may be applied to a high speed shaft of the press thereby reducing the size of the parts.

It will be understood that certain features and sub-combinations are of utility and may be employed without reference to other features and sub-combinations. This is contemplated by and is within the scope of our claim. It is further obvious that various changes may be made in details within the scope of our claim without departing from the spirit of our invention. It is, therefore, to be understood that our invention is not to be limited to the specific details shown and described.

Having thus described our invention, what we claim is:

A clutch assembly including in combination a shaft, a housing mounted for relative rotation around the shaft, a plurality of centrifugal fan blades positioned around the periphery of the housing and secured thereto for rotation therewith, an axially fixed clutch plate carried by the housing, an axially movable clutch plate carried by the housing, said clutch plates being formed with passageways extending radially therethrough, a clutch disc secured to the shaft for rotation therewith and formed with a plurality of apertures, friction blocks movably positioned in the apertures between the clutch plates, means providing communication between the atmosphere and the interior of the housing adjacent the shaft, means formed in the clutch disc adjacent the shaft providing an air passageway through the clutch disc, and means for moving the movable clutch plate to clamp the friction blocks between the clutch plates.

PHILO H. DANLY.
GEORGE I. DANLY.
VASIL GEORGEFF.

REFERENCES CITED

The following references are of record in the file of this patent:

UNITED STATES PATENTS

| Number | Name | Date |
|---|---|---|
| 1,759,755 | Lindner | May 20, 1930 |
| 1,831,083 | Stock | Nov. 10, 1931 |
| 2,089,733 | Criley | Aug. 10, 1937 |
| 2,108,059 | Glasner | Feb. 15, 1938 |
| 2,138,393 | Wichtendahl | Nov. 29, 1938 |
| 2,156,006 | Williams | Apr. 25, 1939 |
| 2,211,191 | Wolfram | Aug. 13, 1940 |
| 2,242,396 | Johansen | May 20, 1941 |
| 2,307,456 | Fawick | Jan. 5, 1943 |
| 2,437,737 | Halby | Mar. 16, 1948 |
| 2,495,463 | Tourneau | Jan. 24, 1950 |